(12) United States Patent
Sjoland

(10) Patent No.: US 9,900,044 B2
(45) Date of Patent: Feb. 20, 2018

(54) TRANSCEIVER ARRANGEMENT AND COMMUNICATION DEVICE

(71) Applicant: Telefonaktiebolaget L M Ericsson (publ), Stockholm (SE)

(72) Inventor: Henrik Sjoland, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 90 days.

(21) Appl. No.: 15/113,342

(22) PCT Filed: Jan. 21, 2014

(86) PCT No.: PCT/EP2014/051155
§ 371 (c)(1),
(2) Date: Jul. 21, 2016

(87) PCT Pub. No.: WO2015/110149
PCT Pub. Date: Jul. 30, 2015

(65) Prior Publication Data
US 2017/0005696 A1    Jan. 5, 2017

(51) Int. Cl.
*H04B 1/525* (2015.01)
*H04L 5/14* (2006.01)
(Continued)

(52) U.S. Cl.
CPC .............. *H04B 1/525* (2013.01); *H04L 5/14* (2013.01); *H04L 27/201* (2013.01); *H04L 43/028* (2013.01)

(58) Field of Classification Search
None
See application file for complete search history.

(56) References Cited

U.S. PATENT DOCUMENTS

| 404,375 A | 6/1889 | Bain |
| 3,900,823 A | 8/1975 | Sokal et al. |

(Continued)

FOREIGN PATENT DOCUMENTS

| CN | 102332931 A | 1/2012 |
| EP | 0388927 A1 | 9/1990 |

(Continued)

OTHER PUBLICATIONS

PCT International Search Report, dated Jun. 29, 2015, in connection with International Application No. PCT/EP2015/051021, all pages.

(Continued)

*Primary Examiner* — Kodzovi Acolatse
(74) *Attorney, Agent, or Firm* — Leffler Intellectual Property Law, PLLC

(57) ABSTRACT

A transceiver arrangement is disclosed. The transceiver arrangement comprises a receiver arranged for frequency-division duplex communication with a communication network and a transmitter arranged for frequency-division duplex communication with the communication network. The transceiver arrangement also comprises a transmission port anda phase shifter arrangement which comprises a first 180° phase shifter and a second 180° phase shifter. The transceiver arrangement further comprises a filtering arrangement. The filtering arrangement comprises filters of a first type and filters of a second type. The filtering arrangement and the phase shifter arrangement are arranged to connect the receiver, transmitter and transmission port forming a first signal path between the transmission port and the transmitter by a first one of the filters of the first type and the first phase shifter in series, a second signal path between the transmission port and the transmitter by a second one of the filters of the first type and a first one of the filters of the second type in series, a third signal path between the (Continued)

transmission port and the receiver by a second one of the filters of the second type and the second phase shifter in series, and a fourth signal path between the transmission port and the receiver by a third one of the filters of the second type and a third one of the filters of the first type in series. The filters of the first type are arranged to pass signals at transmitter frequency and attenuate signals at receiver frequency, and the filters of the second type are arranged to attenuate signals at transmitter frequency and pass signals at receiver frequency. A communication device capable of frequency division duplex communication comprising such a transceiver arrangement is also disclosed.

10 Claims, 3 Drawing Sheets

(51) Int. Cl.
*H04L 27/20* (2006.01)
*H04L 12/26* (2006.01)

(56) References Cited

U.S. PATENT DOCUMENTS

| | | | |
|---|---|---|---|
| 4,325,140 | A | 4/1982 | Stitzer |
| 5,404,375 | A | 4/1995 | Kroeger et al. |
| 6,169,912 | B1 | 1/2001 | Zuckerman |
| 6,567,648 | B1 | 5/2003 | Ahn et al. |
| 6,567,649 | B2 | 5/2003 | Souissi |
| 6,745,018 | B1 | 6/2004 | Zehavi et al. |
| 7,109,793 | B2 | 9/2006 | Nakatani et al. |
| 7,756,480 | B2 | 7/2010 | Loh |
| 8,654,743 | B1 | 2/2014 | Li et al. |
| 8,797,927 | B2 | 8/2014 | Chen |
| 8,909,161 | B2 | 12/2014 | Din et al. |
| 9,143,186 | B2 | 9/2015 | Andersson et al. |
| 9,344,139 | B2 | 5/2016 | Sjoland et al. |
| 2003/0008693 | A1 | 1/2003 | Tanaka et al. |
| 2003/0128081 | A1 | 7/2003 | Ella et al. |
| 2003/0193997 | A1* | 10/2003 | Dent .................. H03F 3/24 375/219 |
| 2004/0180633 | A1 | 9/2004 | Nakatani et al. |
| 2005/0035824 | A1 | 2/2005 | Kearns |
| 2005/0046585 | A1 | 3/2005 | Dodge |
| 2005/0170790 | A1 | 8/2005 | Chang et al. |
| 2006/0028298 | A1 | 2/2006 | Nakanura et al. |
| 2006/0133599 | A1 | 6/2006 | Pagnanelli |
| 2006/0135084 | A1 | 6/2006 | Lee |
| 2006/0261902 | A1 | 11/2006 | Masuda et al. |
| 2007/0015468 | A1 | 1/2007 | Kouki et al. |
| 2007/0117524 | A1 | 5/2007 | Do |
| 2007/0152904 | A1 | 7/2007 | Castaneda et al. |
| 2007/0182509 | A1 | 8/2007 | Park et al. |
| 2007/0202826 | A1 | 8/2007 | Dean |
| 2007/0207747 | A1 | 9/2007 | Johnson et al. |
| 2007/0217488 | A1 | 9/2007 | Smaini et al. |
| 2008/0198733 | A1 | 8/2008 | Nagai |
| 2008/0198773 | A1 | 8/2008 | Loh |
| 2008/0238789 | A1 | 10/2008 | Wilcox |
| 2008/0242235 | A1 | 10/2008 | Adler et al. |
| 2008/0279262 | A1 | 11/2008 | Shanjani |
| 2009/0028074 | A1 | 1/2009 | Knox |
| 2009/0253385 | A1 | 10/2009 | Dent et al. |
| 2009/0289739 | A1 | 11/2009 | Sasaki et al. |
| 2010/0035563 | A1 | 2/2010 | Mikhemar et al. |
| 2010/0109800 | A1 | 5/2010 | Ueda et al. |
| 2010/0148886 | A1 | 6/2010 | Inoue et al. |
| 2010/0253477 | A1 | 10/2010 | Seppa et al. |
| 2010/0279617 | A1 | 11/2010 | Osman |
| 2010/0304701 | A1 | 12/2010 | Jung et al. |
| 2011/0064004 | A1 | 3/2011 | Mikhemar et al. |
| 2011/0064005 | A1 | 3/2011 | Mikhemar et al. |
| 2011/0124309 | A1 | 5/2011 | Trotta et al. |
| 2011/0158134 | A1 | 6/2011 | Mikhemar et al. |
| 2011/0175789 | A1 | 7/2011 | Lee et al. |
| 2011/0187478 | A1 | 8/2011 | Link et al. |
| 2011/0199142 | A1 | 8/2011 | Mu |
| 2011/0221521 | A1 | 9/2011 | Razzell et al. |
| 2011/0299433 | A1 | 12/2011 | Darabi et al. |
| 2011/0299437 | A1 | 12/2011 | Mikhemar et al. |
| 2012/0009886 | A1 | 1/2012 | Poulin |
| 2012/0126907 | A1 | 5/2012 | Nakamoto et al. |
| 2012/0195351 | A1 | 8/2012 | Banwell et al. |
| 2013/0063223 | A1 | 3/2013 | See et al. |
| 2013/0077540 | A1 | 3/2013 | Black et al. |
| 2013/0176912 | A1 | 7/2013 | Khlat |
| 2013/0194978 | A1 | 8/2013 | Andersson et al. |
| 2013/0258911 | A1* | 10/2013 | Choksi .................. H03H 7/09 370/277 |
| 2013/0271004 | A1 | 10/2013 | Min et al. |
| 2013/0315116 | A1 | 11/2013 | Chen |
| 2014/0169231 | A1 | 1/2014 | Mikhemar et al. |
| 2014/0169235 | A1* | 6/2014 | Mikhemar .............. H03H 7/463 370/278 |
| 2014/0253236 | A1 | 9/2014 | Cheeranthodi et al. |
| 2014/0315501 | A1 | 10/2014 | Rudell et al. |
| 2014/0364073 | A1 | 12/2014 | Sjoland et al. |
| 2014/0376419 | A1 | 12/2014 | Goel et al. |
| 2015/0156005 | A1 | 6/2015 | Sjoland et al. |
| 2015/0281974 | A1 | 10/2015 | Ghasemzadeh et al. |
| 2015/0303981 | A1 | 10/2015 | Sjoland et al. |
| 2016/0043767 | A1 | 2/2016 | Andersson et al. |
| 2016/0065352 | A1 | 3/2016 | Sjoland et al. |
| 2016/0072542 | A1 | 3/2016 | Din et al. |

FOREIGN PATENT DOCUMENTS

| | | |
|---|---|---|
| EP | 2226948 A1 | 9/2010 |
| EP | 2296286 A2 | 3/2011 |
| EP | 2388927 A2 | 11/2011 |
| EP | 1813030 B1 | 1/2012 |
| EP | 2672631 A1 | 12/2013 |
| RU | 2264032 C2 | 11/2005 |
| WO | 2006068635 A1 | 6/2006 |
| WO | 2007149954 A1 | 12/2007 |
| WO | 2009080878 A1 | 7/2009 |
| WO | 2011146404 A1 | 11/2011 |
| WO | 2014173459 A1 | 10/2014 |
| WO | 2014177191 A1 | 11/2014 |

OTHER PUBLICATIONS

PCT Written Opinion, dated Jun. 29, 2015, in connection with International Application No. PCT/EP2015/051021, all pages.
Office Action dated May 31, 2017 in connection with U.S. Appl. No. 14/654,655, 14 pages.
Office Action dated Nov. 13, 2017 in connection with U.S. Appl. No. 14/654,655, 29 pages.
Ahmed M Elzayat et al., Tx/Rx Isolation Enhancement Based on a Novel Balanced Duplexer Architecture, Microwave Symposium Digest (MTT), Jun. 5, 2011, pp. 1-4.
Office Action dated Aug. 11, 2016 in connection with U.S. Appl. No. 14/440,893, all pages.
Russian Office Action dated Jul. 26, 2016 in connection with Russian Application No. 2015143996/07(067790), all pages.
English translation of Russian Office Action dated Jul. 26, 2016 in connection with Russian Application No. 2015143996/07(067790), all pages.
PCT International Search Report, dated Jan. 30, 2014, in connection with International Application No. PCT/EP2013/073215, all pages.
PCT Written Opinion, dated Jan. 30, 2014, in connection with International Application No. PCT/EP2013/073215, all pages.
PCT International Search Report, dated Sep. 24, 2014, in connection with International Application No. PCT/EP2014/051155, all pages.
PCT Written Opinion, dated Sep. 24, 2014, in connection with International Application No. PCT/EP2014/051155, all pages.
PCT International Search Report, dated May 2, 2013, in connection with International Application No. PCT/EP2013/051520, all pages.

(56) References Cited

OTHER PUBLICATIONS

PCT Written Opinion, dated May 2, 2013, in connection with International Application No. PCT/EP2013/051520, all pages.
Non-Final Office Action dated Jul. 24, 2015 in connection with U.S. Appl. No. 14/373,419, 15 pages.
Notice of Allowance dated Jan. 21, 2016 in connection with U.S. Appl. No. 14/373,419, 8 pages.
Mohyee Mikhemar et al., An On-Chip Wideband and Low-Loss Duplexer for 3G/4G CMOS Radios, 2010 Symposium on VLSI Circuits/Techical Digest of Technical Papers, pp. 129-130.
Pekka Pursula et al., Hybrid Transformer-Based Adaptive RF Front End for UHF RFID Mobile Phone Readers, 2008 IEEE International Conference on RFID, The Venetian, Las Vegas, Nevada, USA, Apr. 16-17, 2008, pp. 150-155.
M Mikhemar et al., A Tunable Integrated Duplexer and 50dB Isolation in 40 nm CMOS, 2009 IEEE International Solid-State Circuits Conference, ISSCC 2009, Session 22, PA and Antenna Interface, 22/7, 3 pages.
L. Larson et al., 4th Generation Wireless Transceiver Design, Bipolar/Bicmos Circuits and Technology Meeting (BCTM), 2010 IEEE, Piscataway, NJ, USA, Oct. 4, 2019, pp. 113-120.

\* cited by examiner

TRANSCEIVER ARRANGEMENT AND COMMUNICATION DEVICE

TECHNICAL FIELD

The present invention generally relates to a transceiver arrangement. The present invention also relates to a communication device capable of frequency division duplex communication comprising such a transceiver arrangement.

BACKGROUND

Transceivers comprise both a transmitter and a receiver, and are commonly used in a variety of communication apparatuses. Transceivers can be arranged to be operated in semi-duplex, i.e. the receiver and transmitter operate separated in time to prevent the transmitter signal from concealing the received signal. This approach is therefore commonly referred to as time division duplex (TDD). Transceivers can also be operated in full duplex, i.e. the receiver and transmitter operate simultaneously wherein some special arrangements are provided to prevent the transmitter from concealing the received signal. One approach to achieve this is to assign different frequencies for transmission and reception. This approach is therefore commonly referred to as frequency division duplex (FDD).

Often the receiver and the transmitter use the same antenna, or antenna system which may comprise several antennas, which implies that some kind of circuitry may be desired to enable proper interaction with the antenna. This circuitry should be made with certain care when operating the transceiver in full duplex since the transmitter signal, although using FDD, may interfere with the received signal, i.e. internal interference within the transceiver. FIG. 1 illustrates an example of a communication apparatus 100 comprising a transceiver 102, an antenna 104 connected to the transceiver 102, and further circuitry 106 such as processing means, input and output circuitry, and memory means. The transceiver 102 comprises a transmitter 108, a receiver 110, and a duplexer 112 which is connected to the transmitter 102, the receiver 110 and the antenna 104. The duplexer 112 is arranged to direct radio frequency (RF) signal from the transmitter to the antenna, as indicated by arrow 114, and from the antenna to the receiver, as indicated by arrow 116, and can for example comprise a circulator. Duplexers are known in the art and for example described in U.S. Pat. No. 4,325,140. However, duplexers are not ideal and a leakage of transmitter signals from the transmitter to the receiver, as indicated by arrow 118, is at least to some degree present. Further, duplexers are commonly costly, space consuming and challenging to be implemented on-chip. Therefore, efforts have been made in the art to achieve the similar effects with on-chip solutions. These are based on electrical balance by using a dummy load which is arranged to be equal to the antenna impedance. FIG. 2 illustrates an example of such a structure 200, which is also disclosed in WO 2009/080878 A1, comprising a transmitter 202, a receiver 204, and an antenna 206. The transmitter 202 provides its output signal both to a branch towards the antenna 206, the branch comprising a capacitor 208 and an inductor 210, and to a branch towards a dummy load 212, the branch comprising a capacitor 208' and an inductor 210'. The dummy load 212 is arranged to mimic the impedance of the antenna 206, and by the achieved symmetry, and, when using a differential input to the receiver 204 via a transformer 214, the contribution at the receiver input from the transmitted signal can be suppressed. A drawback of this solution is that half the signal energy is lost in the dummy load 212. Another drawback is that a transformer is necessary, which may be hard to implement at low cost and/or low space consumption, e.g. on chip.

SUMMARY

The present invention is based on the understanding that counteracting contribution from a transmitter at a receiver input in a transceiver reduces or cancels the signal. The inventor has found that contribution by the transmitter signal at the receiver input can be further alleviated by a filtering structure and a phase shifter structure, wherein less transmitter energy is lost and the operation is independent of impedance changes at a transmission port for antenna connection.

According to a first aspect, there is provided a transceiver arrangement. The transceiver arrangement comprises a receiver arranged for frequency-division duplex communication with a communication network and a transmitter arranged for frequency-division duplex communication with the communication network. The transceiver arrangement also comprises a transmission port for connecting to an antenna or a communication wire, and a phase shifter arrangement which comprises a first 180° phase shifter and a second 180° phase shifter. The transceiver arrangement further comprises a filtering arrangement. The filtering arrangement comprises filters of a first type and filters of a second type. The filtering arrangement and the phase shifter arrangement are arranged to connect the receiver, transmitter and transmission port forming a first signal path between the transmission port and the transmitter by a first one of the filters of the first type and the first phase shifter in series, a second signal path between the transmission port and the transmitter by a second one of the filters of the first type and a first one of the filters of the second type in series, a third signal path between the transmission port and the receiver by a second one of the filters of the second type and the second phase shifter in series, and a fourth signal path between the transmission port and the receiver by a third one of the filters of the second type and a third one of the filters of the first type in series. The filters of the first type are arranged to pass signals at transmitter frequency and attenuate signals at receiver frequency, and the filters of the second type are arranged to attenuate signals at transmitter frequency and pass signals at receiver frequency.

The filters of the first and second types may be non-directional filters comprising linear components.

The filters of the first type may each comprise a capacitance and a first inductance coupled in parallel where the parallel coupling is coupled in series with a second inductance, and the filters of the second type may each comprise a first capacitance and an inductance coupled in parallel, where the parallel coupling is coupled in series with a second capacitance. At least one of the capacitance and the first and second inductances of each of the filters of the first type may be controllable and be arranged to be controlled by a controller, and at least one of the inductance and the first and second capacitances of each of the filters of the second type may be controllable and be arranged to be controlled by the controller.

The filters of the first type may each comprise a first capacitance and an inductance coupled in parallel, where the parallel coupling is coupled in series with a second capacitance, and the filters of the second type may each comprise a capacitance and a first inductance coupled in parallel where the parallel coupling is coupled in series with a second inductance. At least one of the inductance and the first and second capacitances of each of the filters of the first type may be controllable and be arranged to be controlled by a controller, and at least one of the capacitance and the first and second inductances of each of the filters of the second type may be controllable and be arranged to be controlled by the controller.

At least one of the first and second phase shifters may comprise a transformer arrangement. The transformer arrangement may comprise a first winding connected between a first terminal of the transformer arrangement and a reference voltage and a second winding connected between a second terminal of the transformer arrangement and a reference voltage, wherein the first and second windings have mutually opposite magnetic polarity. The transformer arrangement may comprise an autotransformer with a winding connected between a first terminal of the transformer arrangement and a second terminal of the transformer arrangement, with a tap of the winding connected to a reference voltage.

According to a second aspect, there is provided a communication device, capable of frequency division duplex communication via a communication network, comprising a transceiver arrangement according to the first aspect.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Figure 1:
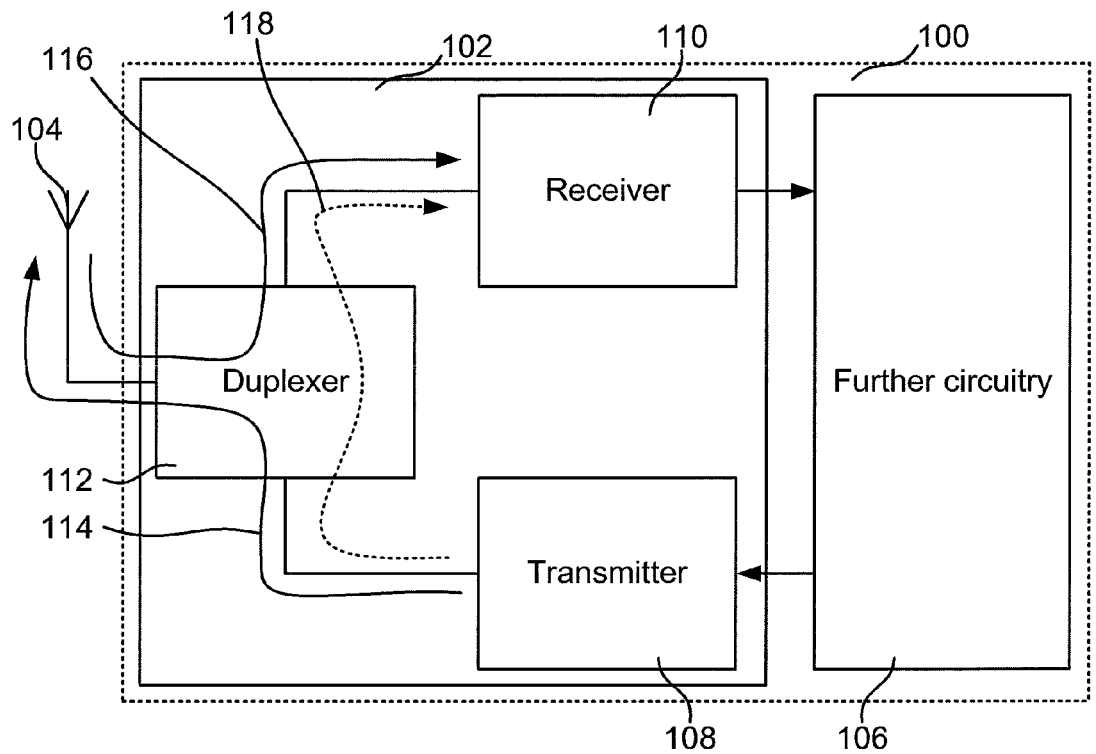
FIG. 1 is a block diagram which schematically illustrates a conventional communication apparatus comprising a transceiver.
Figure 2:
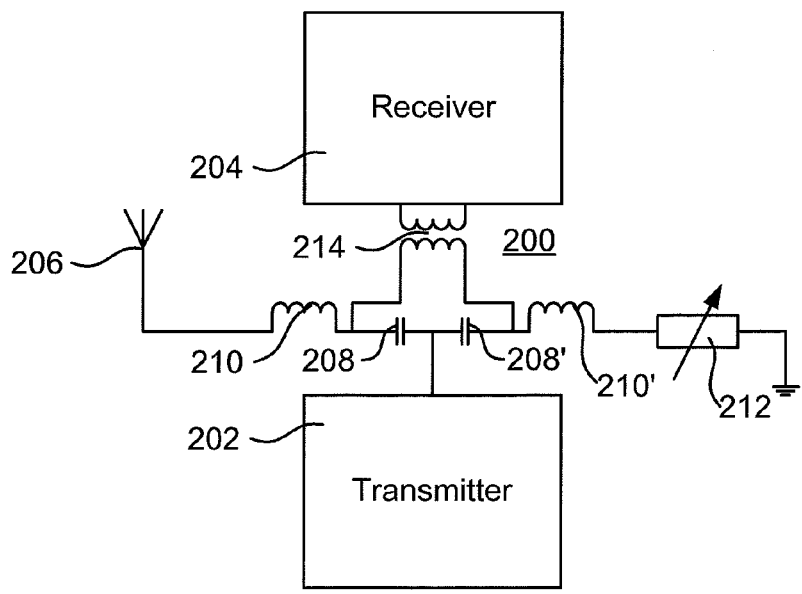
FIG. 2 is a schematic circuit diagram which illustrates an FDD transceiver arrangement with a duplexer based on electrical balance.
Figure 3:
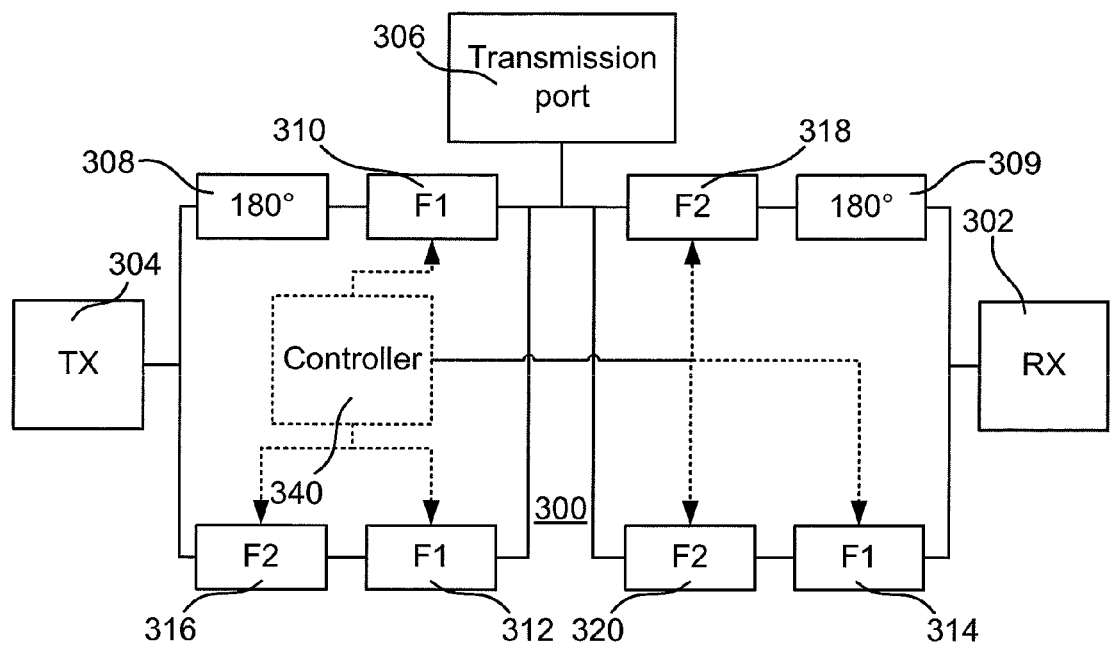
FIG. 3 is a block diagram which schematically illustrates a transceiver according to an embodiment.

FIG. 3 is a block diagram which schematically illustrates a transceiver arrangement 300 according to an embodiment. The transceiver comprises a receiver 302 arranged for frequency-division duplex communication with a wireless or wired communication network, a transmitter 304 arranged for frequency-division duplex, FDD, communication with the wireless or wired communication network, and an antenna port 306 for connecting to an antenna. Herein, the term "antenna port" is used for easier understanding and is evident for the example of a wireless transceiver. The term can be substituted by for example the term "cable connection" to provide easier understanding of how the transceivers disclosed herein can be used for wired operation in all the herein given examples. A general term can be "transmission port", which should apply for both wired and wireless operation. The transmission port is arranged both for transmitting and receiving signals.

The transceiver arrangement further comprises a phase shifter arrangement, which comprises a first 180° phase shifter 308 and a second 180° phase shifter 309, and a filtering arrangement, which comprises filters of a first type 310, 312, 314 and filters of a second type 316, 318, 320.

Filters 310, 312, 314 are of a first type which are arranged to pass signals at transmitting frequency, i.e. the frequency at which the transmitter 304 transmits, and are arranged to attenuate signals at receiving frequency, i.e. the frequency at which the receiver 302 receives desired signals. The transmitting frequency and the receiving frequencies are distinguished since the transceiver 300 is arranged to work with FDD communication. Filters 316, 318, 320 are of a second type which are arranged to pass signals at the receiving frequency and attenuate signals at the transmitting frequency.

The filtering arrangement and the phase shifter arrangement are arranged to connect the receiver 302, transmitter 304 and transmission port 306 forming a first signal path between the transmission port 306 and the transmitter 304 by a first one of the filters 310 of the first type and the first phase shifter 308 in series, a second signal path between the transmission port 306 and the transmitter 304 by a second one of the filters 312 of the first type and a first one of the filters 316 of the second type in series, a third signal path between the transmission port 306 and the receiver 302 by a second one of the filters 318 of the second type and the second phase shifter 309 in series, and a fourth signal path between the transmission port 306 and the receiver 302 by a third one of the filters 320 of the second type and a third one of the filters 314 of the first type in series.

A signal at transmitting frequency from the transmitter 304 is passed via the first signal path towards the antenna port 306 such that it is enabled to be transmitted efficiently through an antenna connected to the transmission port 306. The signal at transmitting frequency from the transmitter 304 is also passed via the second signal path, where the signal is subject to both a filter of the second type 316 and a filter of the first type 312. The signal at the transmitting frequency is then attenuated by the filter of the second type 316, so that the amplitude of the transmitting signal at the transmission port 306 is not much affected by the second signal path. The transmitter noise, i.e. the transmitter signals at receiving frequency, on the other hand will in both paths be attenuated by the filters of the first type 310, 312. The phase shifter 308 will make the signals from the two paths appear with opposite phase. Thus, attenuated transmitter noise at the receive frequency is provided by the two paths, but with opposite phase, and in addition to the attenuation by filtering, cancellation will further reduce the interference passed on to the receiver input.

A received signal from an antenna connected to the transmission port 306 reaches the receiver 302 via the third signal path, i.e. via the filter 318 which passes the receiving signal but attenuates the transmit signal which also is present at the transmission port 306. The received signal is also passed via the fourth signal path, where the signal is subject to both at filter of the second type 320 and a filter of the first type 314. Thus, received signal at transmit frequency attenuated by the filters 318, 320 of the second type is provided by the two paths, but with opposite phase, further reducing the transmitter frequency contribution at the receiver input. This provides for proper handling of the received signal at low-noise amplifier and analog-to-digital conversion at the receiver 302. Receiving frequency signals are attenuated by the filter of the first type 314 in the fourth path. The fourth path will thus have small impact on the receiving signal amplitude reaching the receiver 302.

Thus, the transceiver 300 provides a structure which efficiently provides signals from the transmitter to the transmission port 306, efficiently provides signals from the transmission port to the receiver, and at the same time reduces both receiving and transmitting frequency signals from the transmitter reaching the receiver.

Symmetry in receiving frequency attenuation between the first and second signal paths, and transmitting frequency attenuation between the third and fourth signal paths, respectively, is desired to keep the signals with opposite phase on equal levels to achieve cancelling as demonstrated above.

By using identical filters of the first type in the corresponding signal paths, i.e. the first and the second signal paths and identical filters of the second type in the third and the fourth signal paths, phase and amplitude will track across a wide bandwidth, resulting in a wideband cancellation.

For the first and second signal paths, the filter 316 of the second type has a rather flat frequency response at receiver frequency which is close to a constant loss. By making the loss at receiver frequency of the 180° phase shifter 308 equal to that of the filter 316, the cancellation demonstrated above will be effective and a high isolation at receiver frequency from the transmitter 304 will be achieved. The isolation is independent of antenna impedance of an antenna connected to the transmission port 306 since the receiver frequency current from the transmitter will be cancelled before building up a voltage in the antenna impedance.

Similar applies for the third and fourth signal paths since the filter 314 of the first type has a rather flat frequency response at transmitter frequency close to constant loss, and the loss at transmitter frequency of the 180° phase shifter equal is made equal to that of the filter 314. The isolation of signals at transmitter frequency at the transmission port 306 is also similarly independent on an antenna impedance of an antenna connected to the transmission port 306, and effective isolation is provided at transmitter frequencies from the transmission port 306 to the input of the receiver 302.

For an on-chip solution, the filters of the first type and filters of the second type are normally very consistent, and so are the phase shifters. Thus, as a step in manufacture of such a chip, the mutual agreement in loss between the respective paths may be trimmed by for example a resistor bank, which may be programmable, e.g. by burn switches.

A controller 340 may be arranged to control the filters 310, 312, 314, 316, 318, 320 such that suitable filter characteristics for passing and attenuating signals as described above are achieved for different constellations of frequencies for transmitting and receiving. For example, if the transceiver operates in FDD where transmit frequency is a certain amount higher than the receive frequency, and the transceiver switches to an operation mode where the transceiver operates in FDD and where the receive frequency is a certain amount higher than the transmit frequency, the controller 340 can swap the properties of filter the first and second types. Here, "swap" means: if, in a first state receive signal frequency is higher than transmit signal frequency in the FDD, and upon transition to a second state where receive signal frequency is lower than transmit signal frequency in the FDD, the properties of the filters of first type will be assigned the properties of the filters of the second type as of the first state, and the filters of the second type will be assigned the properties of the filters of the first type as of the first state in sense of frequencies to pass and block. The frequency properties of the respective filter types may also be adapted to the second state, e.g. if other frequencies are applied in the second state. A change of respective properties of filters of first and second types can be made by the controller 340 upon change of the certain amount of frequency difference between receive and transmit frequencies, etc. As noted, signals from the controller are indicated as dotted arrows which indicate control signals provided from the controller 340.

Figure 4:
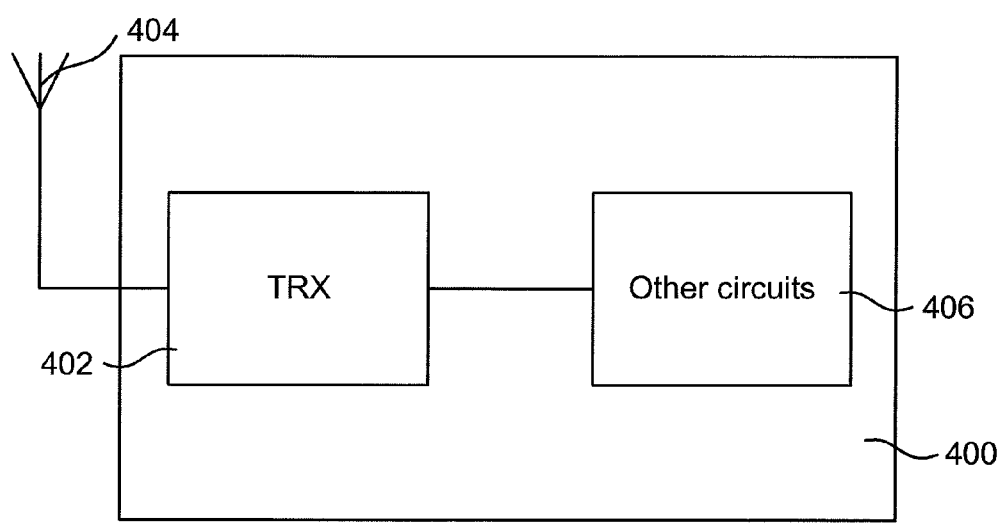
FIG. 4 is a block diagram schematically illustrating a communication device.

FIG. 4 is a block diagram schematically illustrating a communication device 400. The communication device 400 is capable of frequency division duplex communication via a communication network. The communication device 400 comprises a transceiver arrangement 402 according to any of the above demonstrated embodiments. The transceiver arrangement 402 is connected to an antenna 404 through its transmission port. The communication device can also comprise other circuits 406, such as interface towards a user and/or other circuitry or machines, memory, processor, etc. The communication device 400 can be a smartphone or cellphone, a communication card or device in or for a computer, an embedded communication device in a machine, or the like. The communication device 400 can be adapted for cellular communication, point-to-point communication, or for communication in a wireless or wired network.

The transmission port described above need not necessarily by connected to an antenna, but can equally be connected to a wired line which conveys radio frequency signals. Thus, the communication device 400 described with reference to FIG. 4 need not comprise the antenna 404 wherein the communication device is instead connected to such a wired line conveying radio frequency signals.

Figure 5:
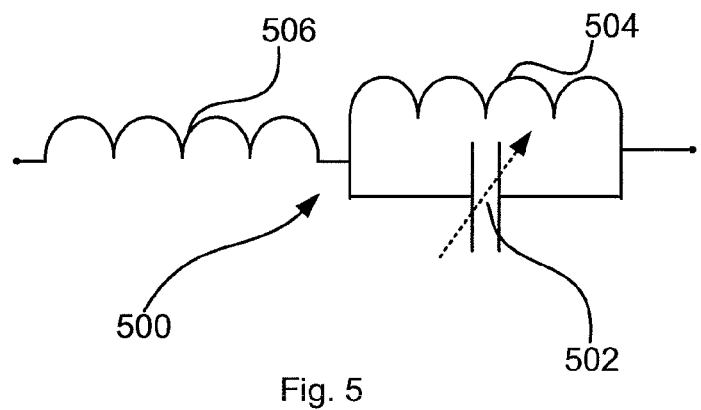
FIG. 5 illustrates a filter according to an embodiment.

The filters in the different embodiments demonstrated above can be made more or less complex, and with different constraints on performance. Simple filters comprising single capacitors or inductors may be used, but may not fulfil the demands of constraints set up. High-order filters may on the other hand introduce other problems, and/or cost/space issues. FIG. 5 illustrates a filter 500 according to an embodiment, which provides dual resonance properties where high insertion loss is provided at one frequency and low insertion loss is provided at another frequency not far from the first frequency, which has been found a reasonable compromise for at least some of the embodiments. It comprises an inductance 504 coupled in parallel with a capacitance 502, wherein the parallel coupling 502, 504 is coupled in series with an inductance 506 between the input and output of the filter 500. It provides a parallel resonance, attenuating the signal at a frequency below a series resonance where the signal is passed.

Figure 6:
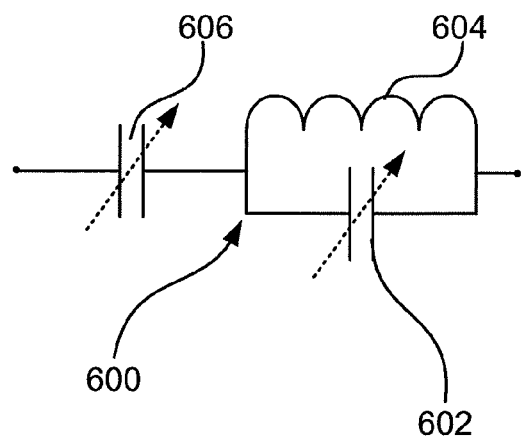
FIG. 6 illustrates a filter according to an embodiment.

FIG. 6 illustrates a filter 600 according to an embodiment, which corresponds to the filter demonstrated with reference to FIG. 5, but with the difference that the parallel coupling 602, 604 is coupled in series with a capacitance 606 between the input and output of the filter 600, and that it provides a series resonance frequency below the parallel resonance frequency.

Depending on whether receiving frequency is higher or lower than the transmitting frequency, the filters of the first type can be selected as one of the types illustrated in FIG. 5 or 6, and the filters of the second type are then selected as the other one of the types illustrated in FIG. 5 or 6.

For the controlling of filter properties as demonstrated above, an efficient way is to let the controller 340 control the capacitance values of capacitances 502, 602, 606 of the filters, e.g. by having the capacitances 502, 602, 606 as controllable capacitance banks. It is of course also possible to control inductors 506, 504, 604.

Figure 7:
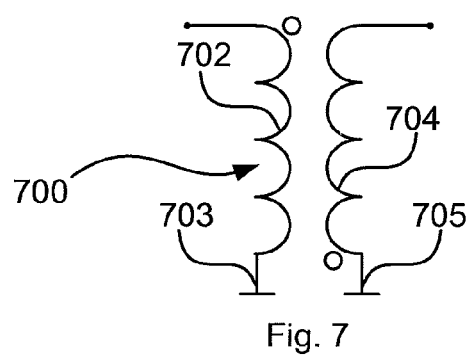
FIG. 7 illustrates a 180° phase shifter according to an embodiment.

FIG. 7 illustrates a 180° phase shifter 700 according to an embodiment. The transformer arrangement 700 comprises a first winding 702 connected between a first terminal of the transformer arrangement and a reference voltage 703 and a second winding 704 connected between a second terminal of the transformer arrangement and a reference voltage 705. The first and second windings are arranged to have mutually opposite magnetic polarity, wherein a signal provided at one of the terminals will provide a signal with opposite polarity, i.e. 180°phase shifted, on the other terminal.

Figure 8:
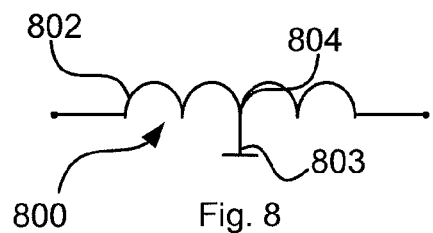
FIG. 8 illustrates a 180° phase shifter according to an embodiment.

FIG. 8 illustrates a 180° phase shifter 800 according to an embodiment. The transformer arrangement 800 comprises an autotransformer with a winding 802 connected between a first terminal of the transformer arrangement a second terminal of the transformer arrangement, and a tap 804 connected to a reference voltage. The magnetic coupling of the winding 802 and the connection with the tap 804 to the reference voltage 803 provides for a signal provided at one of the terminals will provide a signal with opposite polarity, i.e. 180° phase shifted, on the other terminal.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A transceiver arrangement comprising
   a receiver arranged for frequency-division duplex communication with a communication network;
   a transmitter arranged for frequency-division duplex communication with the communication network;
   a transmission port;
   a phase shifter arrangement which comprises a first 180° phase shifter and a second 180° phase shifter; and
   a filtering arrangement, which comprises filters of a first type and filters of a second type,
   wherein the filtering arrangement and the phase shifter arrangement are arranged to connect the receiver, transmitter and transmission port forming
   a first signal path between the transmission port and the transmitter by a first one of the filters of the first type and the first phase shifter in series;
   a second signal path between the transmission port and the transmitter by a second one of the filters of the first type and a first one of the filters of the second type in series;
   a third signal path between the transmission port and the receiver by a second one of the filters of the second type and the second phase shifter in series;
   a fourth signal path between the transmission port and the receiver by a third one of the filters of the second type and a third one of the filters of the first type in series, and wherein
   the filters of the first type are arranged to pass signals at transmitter frequency and attenuate signals at receiver frequency, and the filters of the second type are arranged to attenuate signals at transmitter frequency and pass signals at receiver frequency.

2. The transceiver arrangement according to claim 1, wherein the filters of the first and second types are non-directional filters comprising linear components.

3. The transceiver arrangement of claim 1, wherein the filters of the first type each comprises a capacitance and a first inductance coupled in parallel where the parallel coupling is coupled in series with a second inductance, and the filters of the second type each comprises a first capacitance and an inductance coupled in parallel, where the parallel coupling is coupled in series with a second capacitance.

4. The transceiver arrangement of claim 3, wherein at least one of the capacitance and the first and second inductances of each of the filters of the first type are controllable and are arranged to be controlled by a controller, and at least one of the inductance and the first and second capacitances of each of the filters of the second type are controllable and are arranged to be controlled by the controller.

5. The transceiver arrangement of claim 1, wherein the filters of the first type each comprises a first capacitance and an inductance coupled in parallel, where the parallel coupling is coupled in series with a second capacitance, and the filters of the second type each comprises a capacitance and a first inductance coupled in parallel where the parallel coupling is coupled in series with a second inductance.

6. The transceiver arrangement of claim 5, wherein at least one of the inductance and the first and second capacitances of each of the filters of the first type are controllable and are arranged to be controlled by a controller, and at least one of the capacitance and the first and second inductances of each of the filters of the second type are controllable and are arranged to be controlled by the controller.

7. The transceiver arrangement of claim 1, wherein at least one of the first and second phase shifters comprises a transformer arrangement.

8. The transceiver arrangement of claim 7, wherein the transformer arrangement comprises a first winding connected between a first terminal of the transformer arrangement and a reference voltage and a second winding connected between a second terminal of the transformer arrangement and a reference voltage, wherein the first and second windings have mutually opposite magnetic polarity.

9. The transceiver arrangement of claim 7, wherein the transformer arrangement comprises an autotransformer with a winding connected between a first terminal of the transformer arrangement and a second terminal of the transformer arrangement, with a tap of the winding connected to a reference voltage.

10. A communication device, capable of frequency division duplex communication via a communication network, comprising a transceiver arrangement according to claim 1.

* * * * *